United States Patent
Bazin et al.

(10) Patent No.: US 7,239,878 B2
(45) Date of Patent: Jul. 3, 2007

(54) TELECOMMUNICATION METHOD FOR A WIRELESS NETWORK

(75) Inventors: Claire Bazin, Paris (FR); Olivier Durecu, Marcoussis (FR); Vincent Dollet, Herblain (FR)

(73) Assignee: Alcatel, Paris (FR)

(*) Notice: Subject to any disclaimer, the term of this patent is extended or adjusted under 35 U.S.C. 154(b) by 177 days.

(21) Appl. No.: 10/803,888

(22) Filed: Mar. 19, 2004

(65) Prior Publication Data

US 2005/0003806 A1    Jan. 6, 2005

(30) Foreign Application Priority Data

Mar. 28, 2003  (EP) ................... 03290800

(51) Int. Cl.
*H04Q 7/20* (2006.01)
*H04Q 7/38* (2006.01)

(52) U.S. Cl. .............. 455/456.3; 455/456.1; 455/414.1; 455/414.2; 455/414.3; 455/422.1; 455/403; 455/456.2; 705/14; 709/203; 709/206; 709/216; 709/224

(58) Field of Classification Search .......... 455/456.1, 455/456.2, 456.3, 456.4, 456.5, 456.6, 457, 455/404.1, 404.2, 403, 422.1, 414.1, 414.2, 455/412.1, 412.2, 500, 517, 414.3; 705/14; 709/203, 206, 216, 224
See application file for complete search history.

(56) References Cited

U.S. PATENT DOCUMENTS 6,697,625 B1 * 2/2004 Rune .......................... 455/446
2001/0014911 A1 * 8/2001 Doi et al. ................... 709/221
2003/0153330 A1 * 8/2003 Naghian et al. ............ 455/456
2004/0002897 A1 * 1/2004 Vishik ......................... 705/14
2004/0097229 A1 * 5/2004 Muhonen et al. ........ 455/435.1

FOREIGN PATENT DOCUMENTS

| EP | 1 126 732 A2 | 8/2001 |
| GB | 2 372 175 A | 8/2002 |
| WO | WO 01/28273 A1 | 4/2001 |
| WO | WO 01/65818 A1 | 9/2001 |

OTHER PUBLICATIONS

B. Askwith et al, "Achieving user privacy in mobile networks", Computer Security Applications Conference, 1997. Proceedings, 13th Annual San Diego, CA USA, Dec. 2-12, 1997, Los Alamitos, CA, Dec. 8, 1997, pp. 108-116, XP010261537.

* cited by examiner

*Primary Examiner*—Keith Ferguson
(74) *Attorney, Agent, or Firm*—Sughrue Mion, PLLC

(57) ABSTRACT

A telecommunication method for a wireless network comprises providing a location server and a location based application for the wireless network, requesting a location reporting service by the location based application from the location server, detecting when a wireless mobile telecommunication device fulfils a location condition, assigning a temporary identifier to the wireless mobile telecommunication device by the location server, providing of the temporary identifier to the location based application.

10 Claims, 2 Drawing Sheets

TELECOMMUNICATION METHOD FOR A WIRELESS NETWORK

This invention is bases on a priority application EP 03 290 800.6 which is hereby incorporated by reference.

FIELD OF THE INVENTION

The present invention relates to telecommunication methods for wireless networks, and more particularly to location based services.

BACKGROUND OF THE INVENTION

The location Inter-operability Forum (LIF) has defined a specification for a Mobile Location Protocol (MLP). MLP is a secure access method that enables Internet applications to query location information from a wireless network, irrespective of its underlying air interface technologies and positioning methods. The MLP serves as an interface between a location server and a location-based application. One of the location services defined in MLP is "Triggered Location Reporting Service". This is a service used, when the mobile subscriber's location should be reported at a specific time interval or on the occurrence of a specific event. The location report does not contain data, which would enable to identify the mobile subscriber for privacy reasons.

The present invention aims to provide an improved telecommunication method, in particular for usage on the basis of MLP. Further the invention aims to provide an improved location server and location based application.

SUMMARY OF THE INVENTION

The present invention provides for a telecommunication method for a wireless network which enables to provide user data to a mobile subscriber without revealing the identity of the mobile subscriber to a location based application, which requires to send the user data. In essence, this is accomplished by assigning a temporary identifier, such as a session identifier, to the mobile subscriber, when it enters the specified location.

On the level of the location server, the temporary identifier can be stored together with the Mobile Subscriber Identifier (MSISDN). The MSISDN enables the location server to send various types of messages to the corresponding mobile subscriber. This MSISDN is not communicated from the location server to the location-based application but only the temporary identifier, which has been assigned to the MSISDN. This way the location based application can request the location server to send user data to the mobile subscriber, which entered the location without a need for the MSISDN.

In one application the specified location is a commercial area, such as a supermarket. When a mobile subscriber enters the supermarket, this is detected by the location server and a session identifier is assigned to the mobile subscriber. The session identifier is forwarded from the location server to the location-based application.

The location-based application can in turn request that certain user data be transmitted by making reference to the session identifier. In response, the location server sends out a message of the requested method type with the user data by means of the MSISDN, which is assigned to the session identifier. The user data can be of any type. In the case of the supermarket the user data can contain advertisement or marketing information.

BRIEF DESCRIPTION OF THE DRAWINGS

In the following preferred embodiments of the invention will be described in greater detail by making reference to the drawings in which.

DETAILED DESCRIPTION

Figure 1:
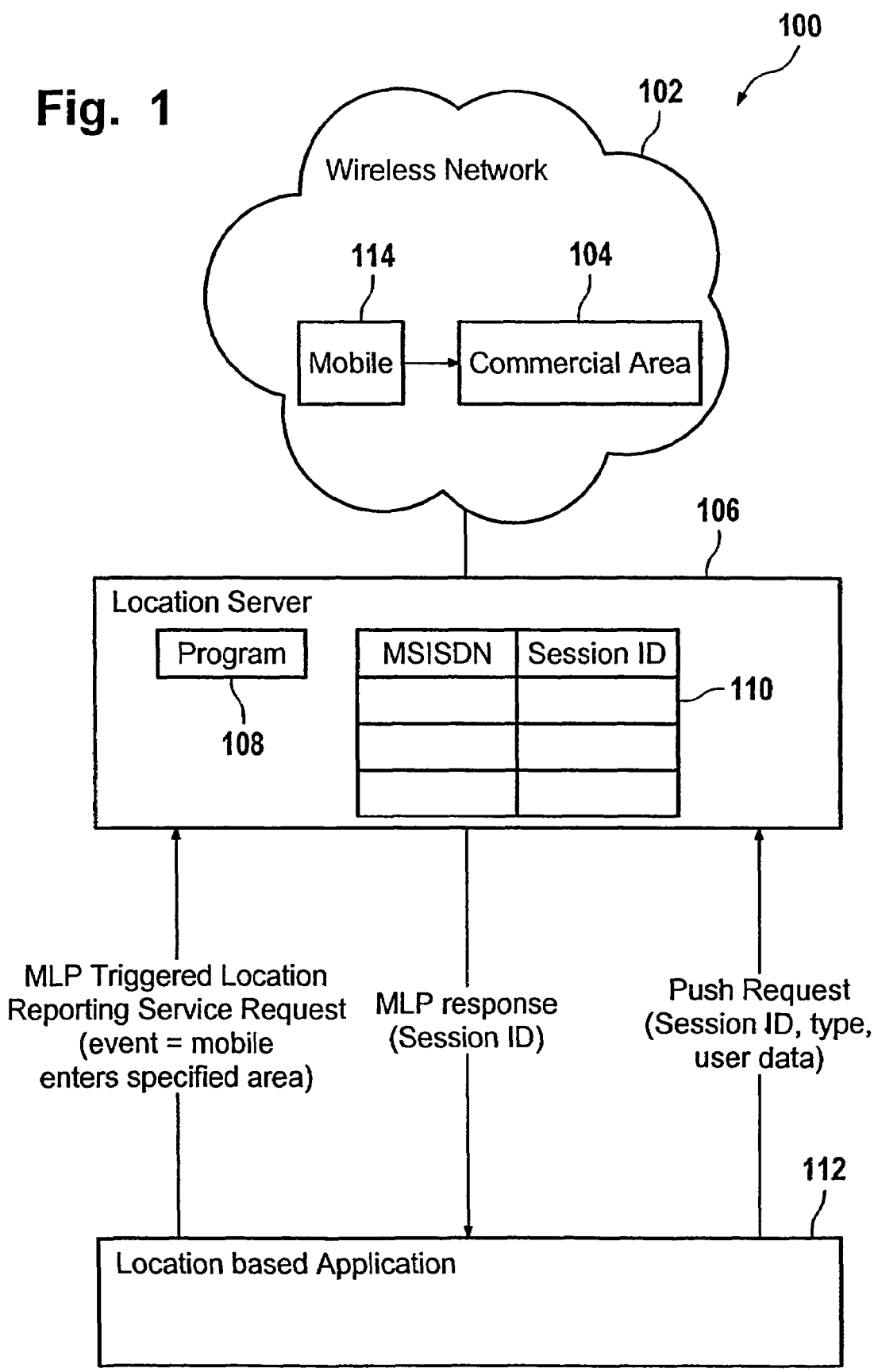
FIG. 1 is a block diagram of a telecommunication system comprising a location server and a location based application.

FIG. 1 shows a block diagram of a telecommunication system 100. Telecommunication system 100 has a wireless network 102, such as a GSM or UMTS-type network. Wireless network 102 covers commercial area 104, such as a supermarket.

Location server 106 is coupled to wireless network 102. Location server 106 has program 108, which serves to generate database 110.

Location based application client 112 can communicate with location server 106. For example, the Internet can be used as communication means for data exchange between the location server 106 and location based application client 112.

Location based application client 112 can request a trigged location reporting service from location server 106 in accordance with MLP. In the request a location specific event is indicated as a trigger for the location reporting. In the example considered here, the event is when a mobile subscriber enters a specified area, which is commercial area 104. Alternatively, other location specific events can be selected as a trigger, such as when the mobile subscriber exits the commercial area 104.

When location server 106 detects that mobile subscriber 114 enters commercial area 104 the location reporting is triggered. Location server 106 receives the MSISDN from mobile subscriber 114. By means of program 108 a Session ID is generated for this MSISDN. Both, the MSISDN and the Session ID, are stored in database 110 for later reference.

Location server 106 sends a response to location based application client 112 in accordance with the MLP. In addition to MLP the response contains the Session ID, which has been assigned to the MSISDN of the mobile subscriber 114 by program 108 of the location server 106.

In response, location based application 112 sends a request to location server 106 to send certain user data in the session with Session ID. The Session ID is used as a key by program 108 to access the corresponding MSISDN of mobile subscriber 114. The user data is than sent from location server 106 to mobile subscriber 114 by means of an SMS, MMS or another message type supported by wireless network 102.

The format of the push request of location-based application 112 to location server 106 can be XML. The structure of the XML push request can be defined by means of Document Type Definition (DTD) files, which are stored on the location server 106, and the location based application client 112. For example, the Session ID, the type of message to be sent from location server 106 to the mobile subscriber, and the user data to be transmitted to the mobile subscriber can be the arguments of the request.

Figure 2:
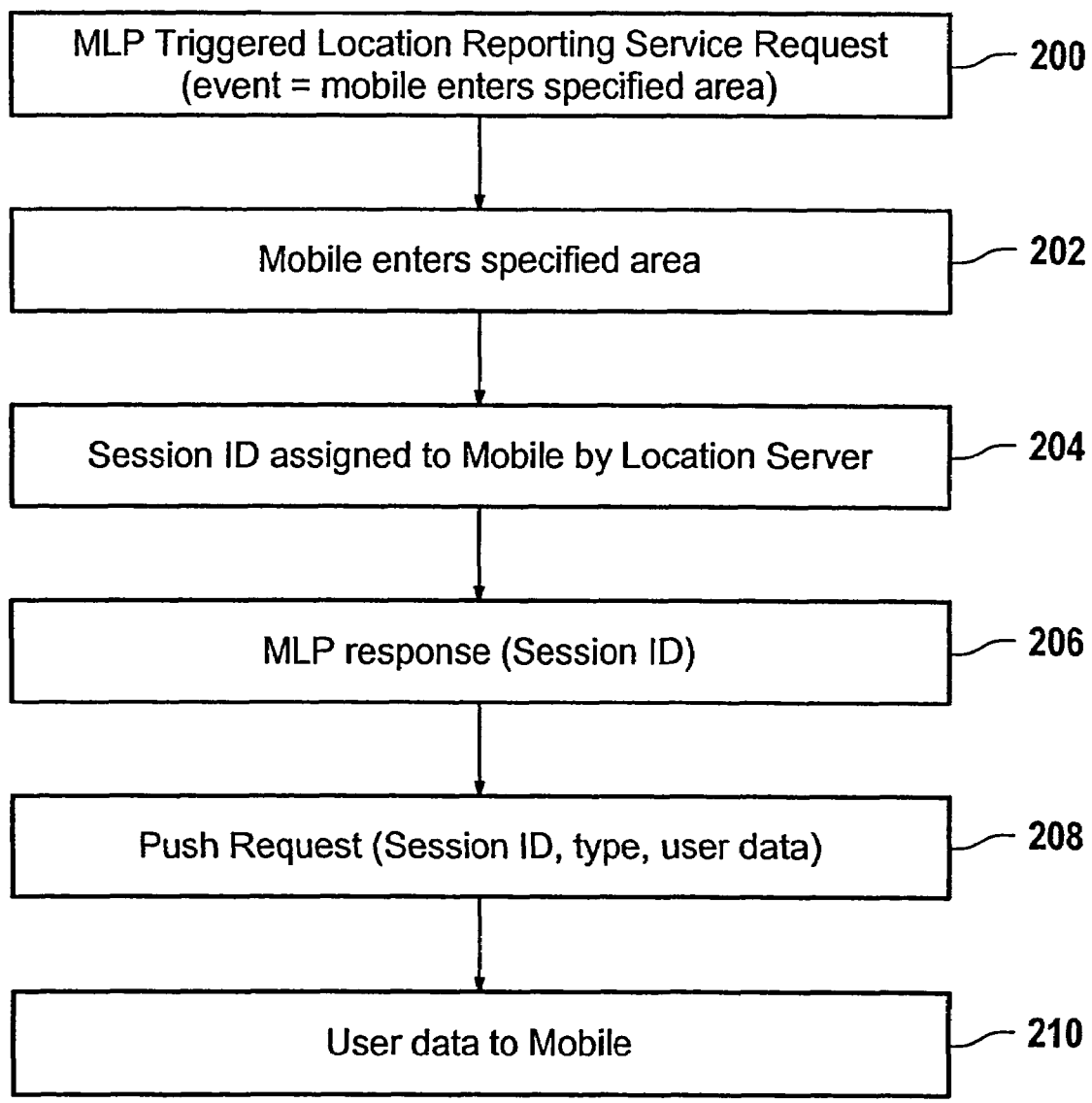
FIG. 2 is illustrative of a flow chart of a method of the invention.

FIG. 2 shows a corresponding flow chart. In step 200 location-based application sends a Triggered Location Reporting Service Request to the location server. In the request a location specific event is specified as a trigger. For example, the trigger condition is fulfilled when any active mobile subscriber enters a specified area.

In step 202 the location server detects that a mobile subscriber enters the specified area. In step 204 the location server assigns a Session ID to the MSISDN of the mobile subscriber. The Session ID and the MSISDN are stored in the database of the location server for later reference.

In step 206 the location server sends a MLP response to the location-based application including the Session ID but not the MSISDN. In step 208 the location based application sends a Push Request including the Session ID, the message type for sending the user data (SMS, MMS, . . . ) and user data as arguments to the location server. In step 210 the location server uses the Session ID as a key in order to retrieve the MSISDN, which has been assigned to the Session ID, from the database. By means of the MSISDN the user data is than sent from the location server to the mobile subscriber using the specified message type.

LIST OF REFERENCE NUMERALS

100 telecommunication system
102 wireless network
104 commercial area
106 location server
108 program
110 database
112 location based application client
114 mobile subscriber

The invention claimed is:

1. A telecommunication method for a wireless network comprising:
   providine a location server and a location based application for the wireless network,
   requesting a location reporting service by the location based application from the location server,
   detecting whether a wireless mobile telecommunication device fulfills a location condition.
   assigning a temporary identifier to the wireless mobile telecommunication device by the location server if it is detected that the wireless mobile telecommunication device fulfills a location condition, and
   providing of the temporary identifier to the location based application; and
   forwarding a request to the location server from the location based application, the request indicates the temporary identifier and requests transmission of user data to the wireless mobile telecommunication device.

2. The method of claim 1, further comprising storing of a mobile subscriber identifier for the wireless mobile telecommunication device and the temporary identifier by the location server.

3. The method of claim 1, further comprising requesting of the transmission of user data by the location-based application, whereby the temporary identifier is comprised in the request.

4. A telecommunication method for a wireless network comprising:
   receiving of a request for a location reporting service from a location based application by a location server,
   detecting when a wireless mobile telecommunication device enters the location,
   assigning a temporary identifier to the wireless mobile telecommunication device if it is detected that the wireless mobile telecommunication device has entered the location,
   forwarding of the temporary identifier to the location based application, and
   receiving of a request to transmit user data from the location based application, whereby the request indicates the temporary identifier.

5. A telecommunication method for a wireless network, comprising:
   requesting a location reporting service from a location server by a location based application,
   receiving of a temporary identifier of a wireless mobile telecommunication device which has fulfilled a location condition from a location server, and
   requesting the transmission of user data to the wireless mobile telecommunication device on the basis of the temporary identifier.

6. A location server for a wireless network comprising:
   means fur receiving of a request for a location reporting service from a location based application,
   means for detecting when a wireless mobile telecommunication device fulfils a location condition,
   means for assigning a temporary identifier to the wireless mobile telecommunication device if it is detected that the wireless mobile telecommunication device fulfills a location condition,
   means for providing of the temporary identifier to the location based application if it is detected that the wireless mobile communication device fulfills the location condition,
   means for receiving from the location based application a request to transmit user data from the location based application, whereby the request indicates the temporary identifier.

7. The location server of claim 6, further comprising database means for storing of mobile subscriber identifiers and assigned temporary identifiers.

8. A location based application server for a wireless network the location based application server comprising:
   means for requesting a location reporting service from a location server,
   means for receiving of a temporary identifier of a wireless mobile telecommunication device which has fulfilled a location condition from the location server, and
   means for forwarding to the location server a request for transmission of user data to the wireless mobile telecommunication device, wherein the request includes the temporary identifier.

9. The location based application client of claim 8, further comprising means for indicating a message type for sending of the user data.

10. A telecommunication system comprising:
   a wireless network, having a wireless mobile telecommunication device;
   a location server comprising:
      means for receiving of a request for a location reporting service from a location based application,
      means for detecting when a wireless mobile telecommunication device fulfills a location condition,
      means for assigning a temporary identifier to the wireless mobile telecommunication device if it is detected that the wireless mobile telecommunication device fulfills the location condition, means for providing of the temporary identifier to the location based application if it is detected that the wireless mobile communication device fulfills the location condition, and means for receiving from the location based application a request to transmit user data from the location based application, whereby the request indicates the temporary identifier; and a location based application server comprising:

means for requesting a location reposing service from a location server, means for receiving of a temporary identifier of a wireless mobile telecommunication device which has fulfilled a location condition from the location server, and means for forwarding to the location server a request for transmission of user data to the wireless mobile telecommunication device, wherein the request includes the temporary identifier.

\* \* \* \* \*